United States Patent [19]

Miura et al.

[11] Patent Number: 5,033,728
[45] Date of Patent: Jul. 23, 1991

[54] DOCUMENT FEEDER

[75] Inventors: Kazunobu Miura; Minoru Kawano, both of Hino; Kazushige Murata; Mitsuru Nagoshi, both of Hachioji, all of Japan

[73] Assignee: Konica Corporation, Tokyo, Japan

[21] Appl. No.: 478,658

[22] Filed: Feb. 12, 1990

[30] Foreign Application Priority Data

Feb. 13, 1989 [JP] Japan .................................. 1-34242

[51] Int. Cl.⁵ ............................................. B65H 5/22
[52] U.S. Cl. ........................................ 271/3; 271/3.1;
355/231; 355/318; 355/321
[58] Field of Search ............... 355/230, 309, 232, 320, 355/321, 231, 75, 318; 271/3, 3.1, 4, 7

[56] References Cited

U.S. PATENT DOCUMENTS

| 4,620,782 | 11/1986 | Kurando et al. | 355/311 |
| 4,857,963 | 8/1989 | Sutou | 355/321 |

FOREIGN PATENT DOCUMENTS

| 0008141 | 1/1988 | Japan | 271/3 |
| 0017724 | 1/1989 | Japan | 271/3 |
| 0267258 | 10/1989 | Japan | 271/3.1 |

*Primary Examiner*—A. T. Grimley
*Assistant Examiner*—Christopher Horgan
*Attorney, Agent, or Firm*—Finnegan, Henderson, Farabow, Garrett, and Dunner

[57] ABSTRACT

An apparatus which includes a feeding device for feeding a document onto a document platen on which the document is irradiated by a light source to obtain a copy image and a discharging device for discharging the irradiated document from the document platen. The apparatus includes a housing unit shaped in the form of a plate for covering the document platen; a hinge for pivotally mounting the housing unit on the document platen, and first, second and third sub-housings made to protrude upwards from the top surface of the housing unit. The first sub-housing is disposed on one side of the housing unit and incorporates the feeding device. The second sub-housing is disposed on the opposite side to the one side and incorporates the discharging device. The third sub-housing is disposed on a side between the one side and the opposite side and incorporates both the hinge and driving mechanism for both the feeding device and the discharging device.

9 Claims, 6 Drawing Sheets

DOCUMENT FEEDER

BACKGROUND OF THE INVENTION

1. Field of the Invention

The present invention relates to an improved document feeder which automatically feeds a document onto a platen glass of a copier or an image reading apparatus and delivers the document from the platen glass after being processed.

2. Description of the Related Art

Generally speaking, this kind of document feeder is composed of; a document stock unit (a document tray) which is placed on one side of the platen glass; a document feeding means which feeds a document from the document tray onto the platen glass sheet by sheet; a document conveying means which is provided on the platen glass, which conveys the document fed from the document feeding means, sets the document at the exposure position on the platen glass, and delivers the document from the platen glass after a prescribed number of exposures are conducted; and a document delivery means which conveys an exposed document to be stacked on a delivery tray.

The above-described document feeder can be opened and closed freely with regard to the platen glass, which is installed on the upper portion of the copier. Since the document feeder is made with the above-described structure, it is possible to conduct copying of a special document, such as a stereoscopic document, a book document, and a special size document, to remove a jammed document, and to clean the platen glass. There are two types of document feeders from the viewpoint of the direction in which they open and close. One is the side opening type document feeder which opens and closes in the same direction as that of document conveyance. The other is the document feeder which opens and closes in the direction at a right angle with the document conveyance direction. These two types of document feeders are commonly used.

In the above-described document feeders, the document tray is provided on the upper portion, or on the side portion, of the copying apparatus and an exposed document is conveyed straight from the platen glass to the delivery tray which is mounted on the outside of the apparatus, or an exposed document makes a U-turn to be delivered onto the delivery tray which is provided on the upper portion of the apparatus or onto the delivery tray which is provided at a slanting upper position with regard to the above-described document tray. For that reason, the total length or the total height of the apparatus becomes so large that it has been difficult to make the apparatus compact.

Besides, the above-described large and heavy document feeder must be opened and closed with regard to the platen glass mounted on the upper portion of the apparatus. Therefore, the structure of the apparatus and the hinge to support the document feeder must be made strongly and the structure becomes complicated. Accordingly, it is hard to open and close the document feeder.

SUMMARY OF THE INVENTION

It is an object of the present invention to provide an improved document feeder, having a strong and light housing which is U-shaped, combining a main frame and an external cover so that the document feeder can be opened and closed easily with excellent maneuverability, and having a feeding unit, a conveyance unit, and a delivery unit built in the document feeder compactly, wherein the total height of the document feeder is low.

In order to accomplish the above-described object, this document feeder which feeds document sheets stacked on a tray onto a platen of an image forming apparatus sheet by sheet and delivers the document sheets exposed on the platen to a delivery tray, comprises a housing having a U-shaped protruded portion which protrudes upwards from the upper surface of the housing. The U-shaped protruded portion has a square section. The first part of the protruded portion has a document sheet feeding means. The second part of the protruded portion has a document sheet delivery means. The third part of the protruded portion which connects the first part of the protruded portion with the second part of the protruded portion has a drive means which brings in, conveys, and delivers the document sheets. Furthermore the third part of the protruded portion has a hinge means which makes it possible to open and close the housing, so that the strength of the housing can be improved and its size and weight can be minimized to utilize the space effectively.

DETAILED DESCRIPTION OF THE PREFERRED EMBODIMENT

Figure 1:
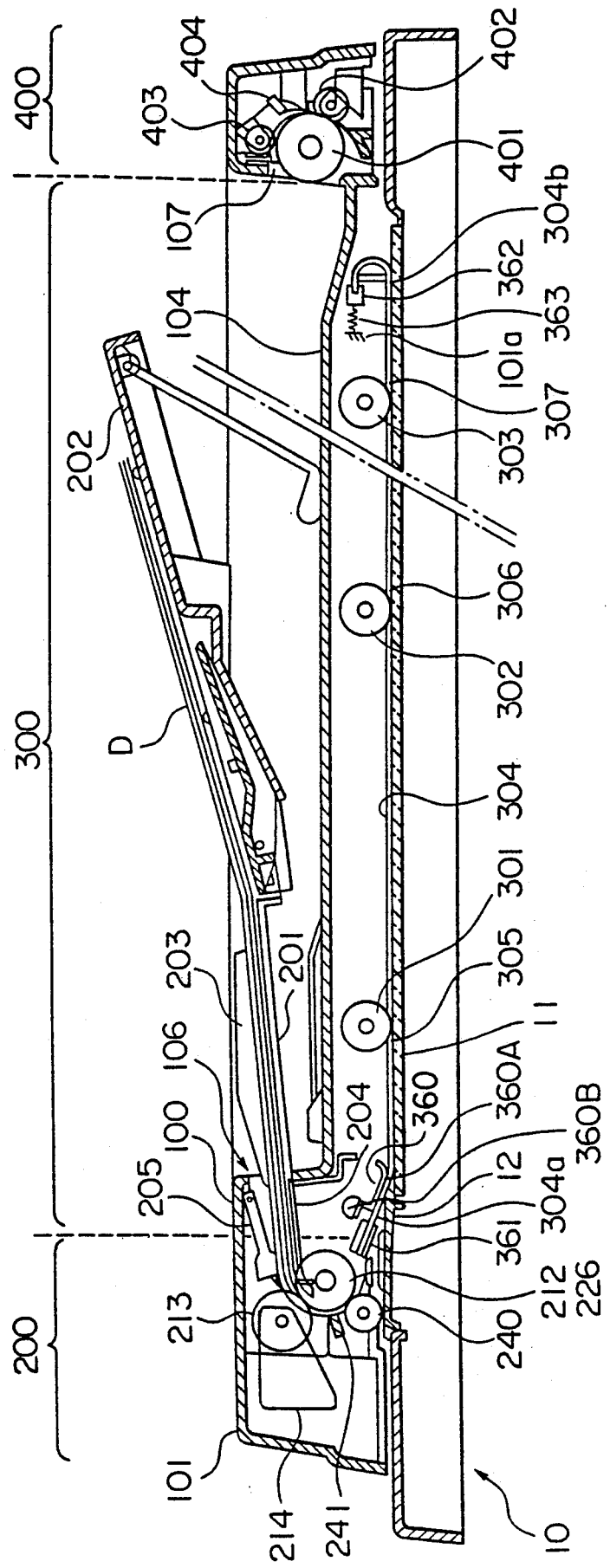
FIG. 1 is a sectional view of preferred embodiment of the document feeder of the present invention.
Figure 2:
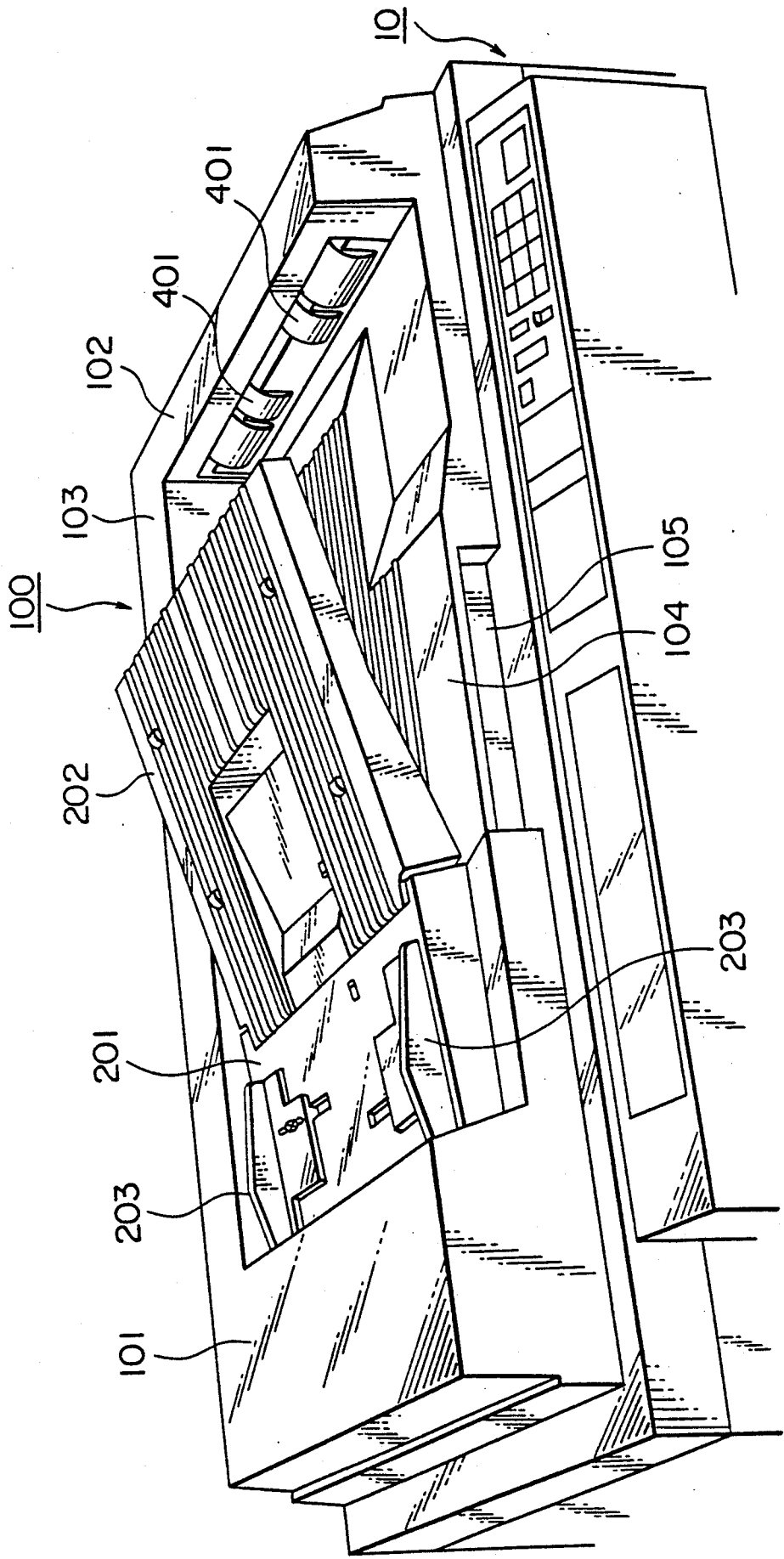
FIG. 2 is a perspective view of the document feeder of FIG. 1.
Figure 3:
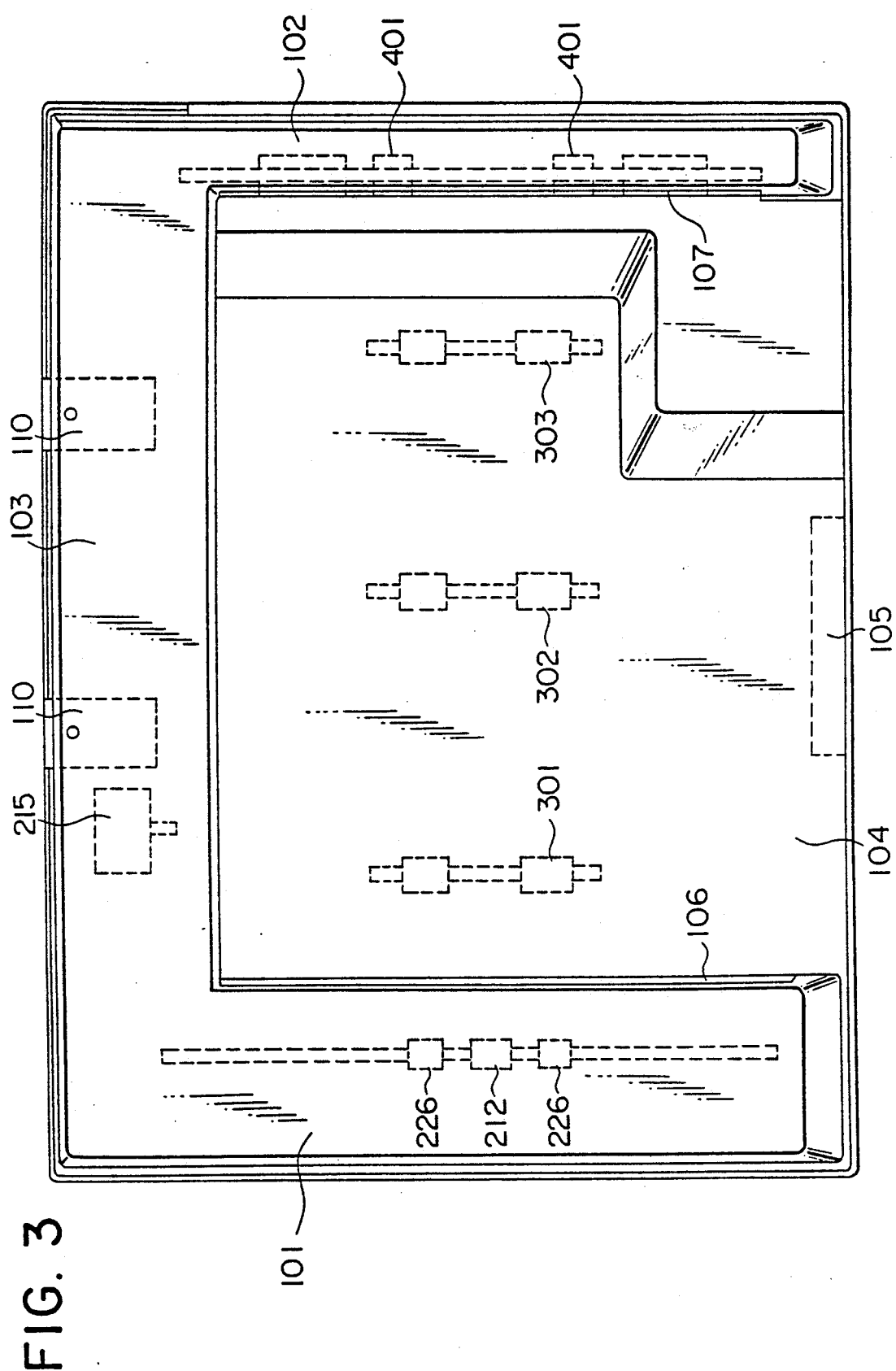
FIG. 3 is a top plan view of the document feeder of FIG. 1.

Features and advantages of the present invention will be apparent from the following description of an example taken in connection with the accompanying drawings.

In these drawings, the numeral 10 is the main body of a copier. The numeral 11 is a platen glass (a document table). The numeral 12 is a document trailing edge stopping board (a bumping board). The document feeder is mounted on the above-described platen glass. The document feeder is connected with hinge means 110 which is placed on the upper portion of the copier 10, and is capable of opening and closing with regard to the platen glass 11. The above-mentioned document feeder includes the document feeding part 200, the document conveyance part 300, the document delivery part 400, and the housing 100 in which these units are installed. On the upper portion of the document feeder, the inclined document tray is installed, and is composed of the fixed document tray 201 fixed to the housing 100, and the movable document tray 202 which is capable of lifting up. Documents D are stacked on the document tray and the leading edge of the document may enter the document feeding unit 200. The document side edge regulating board 203 is mounted movably on the fixed document tray 201 so that the side edges of document D can be regulated when document D is set on the fixed document feeding tray.

An approximately central portion of the delivery side of the fixed document tray 201 has a U-shaped cutout, so that the movable guide plate 204 is capable of moving upwards and downwards in the space of the U-shaped cutout. The movable guide plate 204 is connected with a solenoid which is not illustrated.

On the upper side of the above-described movable guide plate 204 the feeding lever 205 is installed being capable of moving freely. To explain in detail, one end of the feeding lever 205 is supported by a shaft and the feeding lever 205 can move freely in the document feed opening 106 made in the housing 100. The other end of the feeding lever 205 comes into contact with document D and presses the surface of the document with its own weight.

When a document is fed, the above-described movable guide plate 204 is at a raised position and remains a little above the upper surface of the feeding roller 212. In this condition, document D is set on the fixed document tray 201 and the movable document tray 202. Then document D is pushed forward in the document feeding direction, and the leading edge of document D is forwarded along the above-mentioned movable guide plate 204. At the same time the leading edge pushes upwards the free end part the feeding lever 205, which hangs down from the shaft fixed to the housing. After that, document D comes into contact with both the outer surface of the double feed preventing roller 213, which will be explained later, and the rib of the housing 100 and stops. FIG. 1 is a sectional view which illustrates the condition in which document D is set.

When the above-mentioned solenoid is electrified according to the signal which indicates the start of document feeding, the movable guide plate 204 is seesawed and its tip descends below the upper surface of the above-described fixed document tray 201.

Referring to FIG. 1, the document feed part 200 is placed on the left side of the document trays 201, 202. A stack of documents D are conveyed from the document trays into the document feed part 200 and the lowermost document in the stack is fed by the document delivery means (the first document feed means). The separated document D is conveyed onto the platen glass 11 of the copier by the second document feed means.

Figure 4:
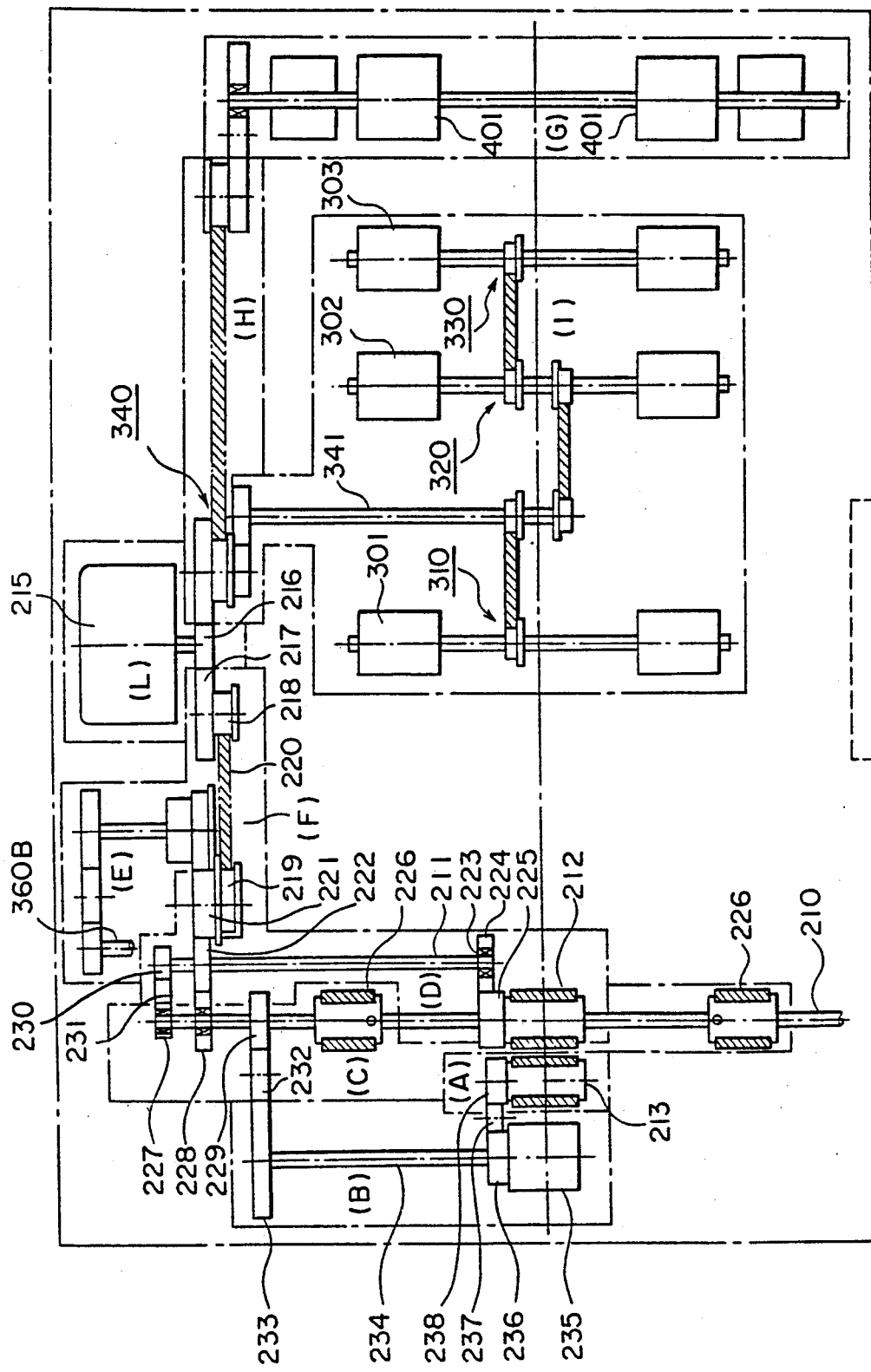
FIG. 4 is a drive system diagram of the preferred embodiment of the whole document feeder of the present invention.

As illustrated in FIG. 4, the document feeding means includes the delivery roller (the first feed roller) 212, which is mounted on the middle portion of the first drive shaft 210 being capable of rotating freely, and the double feed preventing roller 213 which is supported by a shaft fixed to the double feed preventing roller setting board 214.

FIG. 4 is a drive system diagram of the whole document feeder. The second drive shaft 211 is driven by the drive shaft of the main motor 215 through the gears 216, 217, the timing pulleys 218, 219, the timing belt 220, the gear 221 which is mounted on the same shaft as the timing pulley 219, and the gear 222 which is integrated with the above-mentioned second drive shaft 211. At one end of the second drive shaft 211, the gear 224 in which a one-way clutch is built is mounted. This gear 224 is engaged with the gear 225 which is integrated with the first feed roller 212, which is mounted on the first drive shaft 210 being capable of rotating freely. Although the main motor 215 is rotated normally and reversely, the first feed roller 212 which is mounted on the first drive shaft 210, is driven by the second drive shaft 211 only when the main motor is rotated reversely, and when the main motor is rotated normally, the first feed roller 212 is not driven since power is not transmitted to it.

On both sides of the first feed roller 212 mounted on the first drive shaft 210, the second feed rollers 226, 226 are installed and rotated integrally together with the drive shaft.

At the end of the first drive shaft 210, two gears, 227 and 228, in which one-way clutches are built and the gear 229 which is fixed on the shaft, are placed.

At the end of the second drive shaft 211, the gear 230 is fixed on the shaft. The gear 230 is engaged through the idler gear 231 with the gear 227 mounted at the end of the first drive shaft 210.

According to the mechanism explained above, the first drive shaft 210 and the second feed rollers 226, 226 which are fixed on the first drive shaft 210, are always driven in the constant direction to feed document D regardless of the direction of rotation of the main motor 215.

The gear 229 which is fixed on the first drive shaft 210 transmits drive force through the idler gear 232 to the third drive shaft (a torque limiter shaft) 234 which has the gear 233 fixed to one end of the shaft. On the other end of the third drive shaft 234, the gear 236 with the torque limiter 235 is mounted. The gear 236 is engaged through the idler gear 237 with the gear 238 which is integrated with the double feed preventing roller 213. The double feed preventing roller 213 comes into contact with the first feed roller 212 with pressure to form a nip.

As explained above, the first drive shaft 210 is rotated in a constant direction regardless of the direction of rotation of the main motor 215. Accordingly, the double feed preventing roller 213 which is engaged with the first drive shaft through the gears, can be rotated in a constant direction.

While a document is being fed by the first feed roller 212 and the double feed preventing roller 213, the second feed rollers 226, 226 which are fixed on the first drive shaft 210, on which the first feed roller 212 is mounted being capable of rotating freely, also rotate in the same direction as the first feed roller 212 at the same speed so that they can help document D make a U-turn.

The second section of the document feed means 200 is composed of two second document feed rollers 226, 226 and the follower roller 240. The two second document feed rollers 226, 226 are fixed on the first drive shaft 210 on both sides of the first feed roller 212 which is mounted on the shaft being capable of rotating freely. The follower roller 240 comes into contact with the rollers 226, 226 on the underside and is rotated by the rotation of the rollers 226, 226.

The diameter of the second feed rollers 226, 226 is a little larger than that of the first feed roller 212, and the second feed rollers 226, 226 can be driven independently of the first feed roller 212. Furthermore, when the first feed roller 212 is rotated, the second feed rollers 226, 226 are rotated in the same direction as the first feed roller 212 so as not to interrupt the feeding of document D.

The document detecting sensor 241 is installed on the document path close to the position where the follower roller 240 comes into contact with the first feed delivery roller 212 with pressure, immediately after the nip position between the delivery roller 212 and the double feed preventing roller 213. The document detecting sensor 241 is switched on when the leading edge of a document separated from the stack of documents D at the nip position passes through the detector, and switched off when the trailing edge of document D passes through the detector.

After the prescribed amount of time has passed from when the document detecting sensor 241 detects the leading edge of document D, the solenoid is activated and the movable guide plate 204 is lowered by activating each member of the link mechanism.

At the same time, the direction of rotation of the main motor 215 is changed from reverse rotation to normal rotation. However, the first drive shaft 210 continues to rotate in the same direction and the second feed roller 226 which are fixed on the first drive shaft 210 also continue to rotate in the same direction. In this case, drive force is transmitted through the gear 230 mounted on the second drive shaft, the idler gear 231, and the gear 227 in which a one-way clutch is built and finally the first drive shaft 210 is driven, wherein drive force is not transmitted to the gear 228 in which a one-way clutch is built.

As explained above, the direction of rotation of the main motor is changed from reverse rotation to normal rotation. In accordance with the change of the direction of rotation of the main motor, the direction of rotation of the second drive shaft 211 is also changed from reverse direction to normal direction. However, the gear 224 can be rotated freely due to the one-way clutch 223 mounted on the end of the second drive shaft 211. As a result drive force is transmitted neither to the gear 225 which is engaged with the gear 224 nor the first feed roller 212 which is integrated with the gear 225.

When the leading edge of document D is pinched between the second feed rollers 226, 226 and the follower roller 240, document D comes into contact with both the first feed roller 212 which can be rotated freely and the second feed roller 226 which is rotated in the normal direction. Therefore, document D makes the first feed roller 212, which is idling at this time, rotate in the document feeding direction.

Since the first drive shaft 210 continues to rotate in the normal direction, the double feed preventing roller 213 is continuously rotated in the normal direction to prevent double feeding of subsequent documents. The second feed rollers 226 are continuously rotated to convey separated document D to the conveyance part 300.

The conveyance part 300 is for conveying document D onto the platen glass 11. It is equipped with the white sheet member 304 and the document conveying rollers 301, 302, 303 as the main components. The white sheet member 304, which is called the sheet member hereafter in this specification, is for pressing document D against the platen glass during exposure. The sheet member 304 is made from a plastic which has a low friction coefficient. In this example, polyethylene terephthalate is used. The sheet member 304 covers the whole upper surface of the platen glass. One end of the sheet member 304 is fixed to the edge of the housing 100 on the document feed part 200 side. The other end of the sheet member 304 is fixed to the fixed portion 101a of the housing 100 on the document delivery part 400 side. The holes 305, 306, 307 are provided at appropriate places on the sheet member 304 along its center line. Portions of the document conveying rollers 301, 302, 303 protrude through the holes 305, 306, 307.

The document conveying rollers 301, 302, 303 are for conveying document D on the platen glass 11. The document conveying rollers are installed at positions corresponding to the holes 305, 306, 307 so that they can press document D against the platen glass 11 through the holes 305, 306, 307 in the sheet member 304 in order to convey document D by friction force. The surfaces of the conveying rollers 301, 302, 303 are covered by elastic materials with a high friction coefficient such as foamed polyurethane, rubber, or plastic sponge, and they come into contact with the surface of the platen glass 11. The document conveying rollers 301, 302, 303 can be rotated both normally and reversely so that the document position can be finely adjusted. Referring to FIG. 1, the left side edge 304a of the sheet member 304 in the document feed part 200 is fixed to the sheet fixing bar 361 by adhesion. The extended portions of both sides of the sheet fixing bar 361 are fixed by screws to the frame in the document feed part 200.

The right side edge 304b of the sheet member 304 on the document delivery part 400 side is fixed by adhesion to the curved portion of another sheet fixing bar 362. The central portion of the sheet fixing bar 362 is connected to the fixed portion in the document conveying part 300 being pulled by a coiled spring 363.

When document D is exposed, the sheet member pressing means 360 causes the sheet member 304 to come into close contact with the platen glass 11 so that document D can be exposed in good conditions. When document D is conveyed, the sheet member pressing means 360 is lifted from the surface of the platen glass 11 so that document D can be smoothly conveyed. The structure of the sheet member is such that the sheet member 304 is always raised upwards, unless it is pressed downwards forcedly. The sheet member pressing means 360 is composed of the pressure plate 360A (a swing back board) and the pressure plate drive shaft 360B. The pressure plate 360A is mounted on the same shaft as the sheet member 304 so that it can press the sheet member 304 against the trailing edge stopping plate 12 with a uniform pressure. The pressure plate 360A is made from a resilient material. The surface of the pressure plate 360A which comes into contact with the sheet member 304 is concave.

The pressure plate drive shaft 360B is driven by the main motor 215 through the gear train. The structure of the drive system will be apparent from FIG. 4. Refer to the swing back board unit (E) of FIG. 4. The torque limiter is installed at the end of the pressure plate drive shaft 360B. The function of the torque limiter is to maintain the condition of contact between the pressure plate 360A and the trailing edge stopping plate 12 when the trailing edge stopping plate 12 comes into contact with the pressure plate 360A, and to protect the pressure plate 360A from being given too much pressure.

The main motor 215 drives both the document feed part 200 and the document conveying part 300 simultaneously. The gear 216 which is fixed on the main motor 215 shaft, is connected with the document conveying drive unit 340 through the gear train and drives the drive shaft 341 (a stationary shaft).

The first conveying roller part 310 is placed in the upstream portion of document flow and is driven through the timing belt. The second conveying roller part 320 is placed in the downstream portion of document flow, and is driven through the timing belt, and the third conveying roller part 330 is placed at a further downstream portion of document flow.

The document conveying rollers in the first conveying roller part 310 are pressed against the platen glass by pressure from a spring, and at the same time drive force is transmitted to the document conveying rollers through the timing belt wound around the timing pulley.

The document conveying rollers in the second conveying roller part 320 are also pressed against the platen glass by pressure from a spring and drive force is transmitted to the rollers through the timing belt and the timing pulley.

The document conveying rollers 303 in the third conveying roller part 330 are driven through the timing belt and the timing pulley and rotated integrally with the timing pulley. A spring also presses the conveying rollers 303 in the same way as described above to press them against the platen glass 11.

In these drawings, the holes 305, 306, 307 are provided to the sheet member 304 at the appropriate positions so that the document conveying rollers 301, 302, 303 can be pressed against the platen glass 11 through the holes. Since each of the conveying rollers 301, 302, 303 consists of two elastic rollers on its shaft as illustrated in FIG. 4, there are six holes on the sheet member 304 corresponding to the resilient conveying rollers.

The conveyance process and delivery process of document D will be described as follows.

Referring to FIG. 1, document D is conveyed by the document feed part 200 to the platen glass 11. Document D is slid onto the platen glass 11 by the conveying rollers 301, 302, 303. Then, the trailing edge of document D passes over the document trailing edge stopping plate 12.

As the trailing edge of document D passes over the document detecting sensor 241, the trailing edge detecting signal is generated and the prescribed number of pulses are counted. When the number of pulses has been counted up, the direction of rotation of the main motor 215 is changed from normal rotation to reverse rotation, and the second feed roller 226 is rotated reversely a little and the trailing edge of document D is brought into contact with the trailing edge stopping plate 12. As a result of this operation, document D is set at the correct position on the platen glass 11.

After that, the prescribed number of pulses are counted. Then the sheet member 304 presses document D against the platen glass 11, and scanning of document D and image forming processing start in the copier 10.

Exposed document D passes through the conveyance part 300 and is delivered by the delivery roller 401 being pinched by the pinch rollers 402, 403. After that, document D is discharged from the delivery opening 107 of the housing 100 to the delivery tray 104 and stacked on the tray.

When the leading edge or the trailing edge of document D is detected by the delivery sensor 404, which is installed in the path of document D in the document delivery part 400, the second and successive documents are fed by the document feeder in the same way as explained above.

Figure 5:
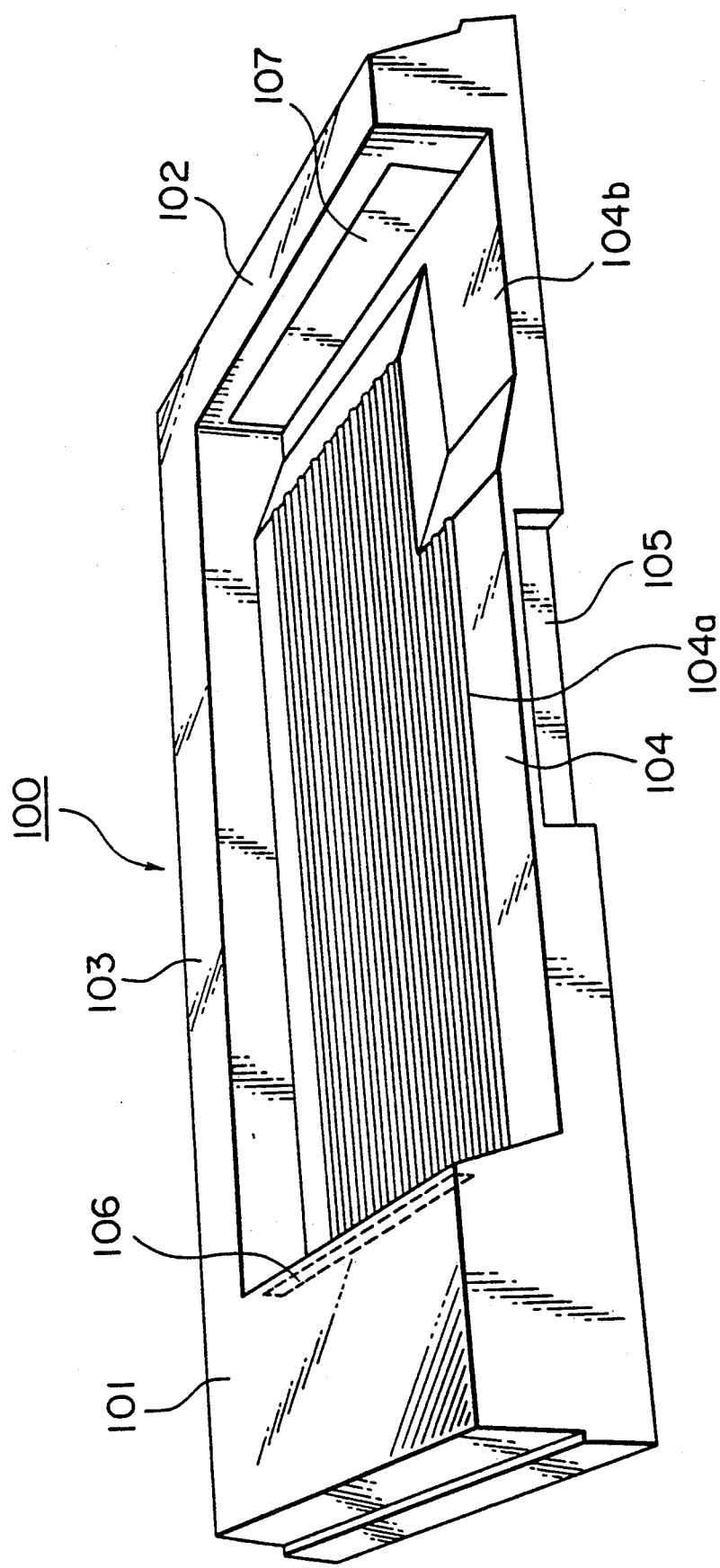
FIG. 5 is a perspective view of the housing of the document feeder.
Figure 6:
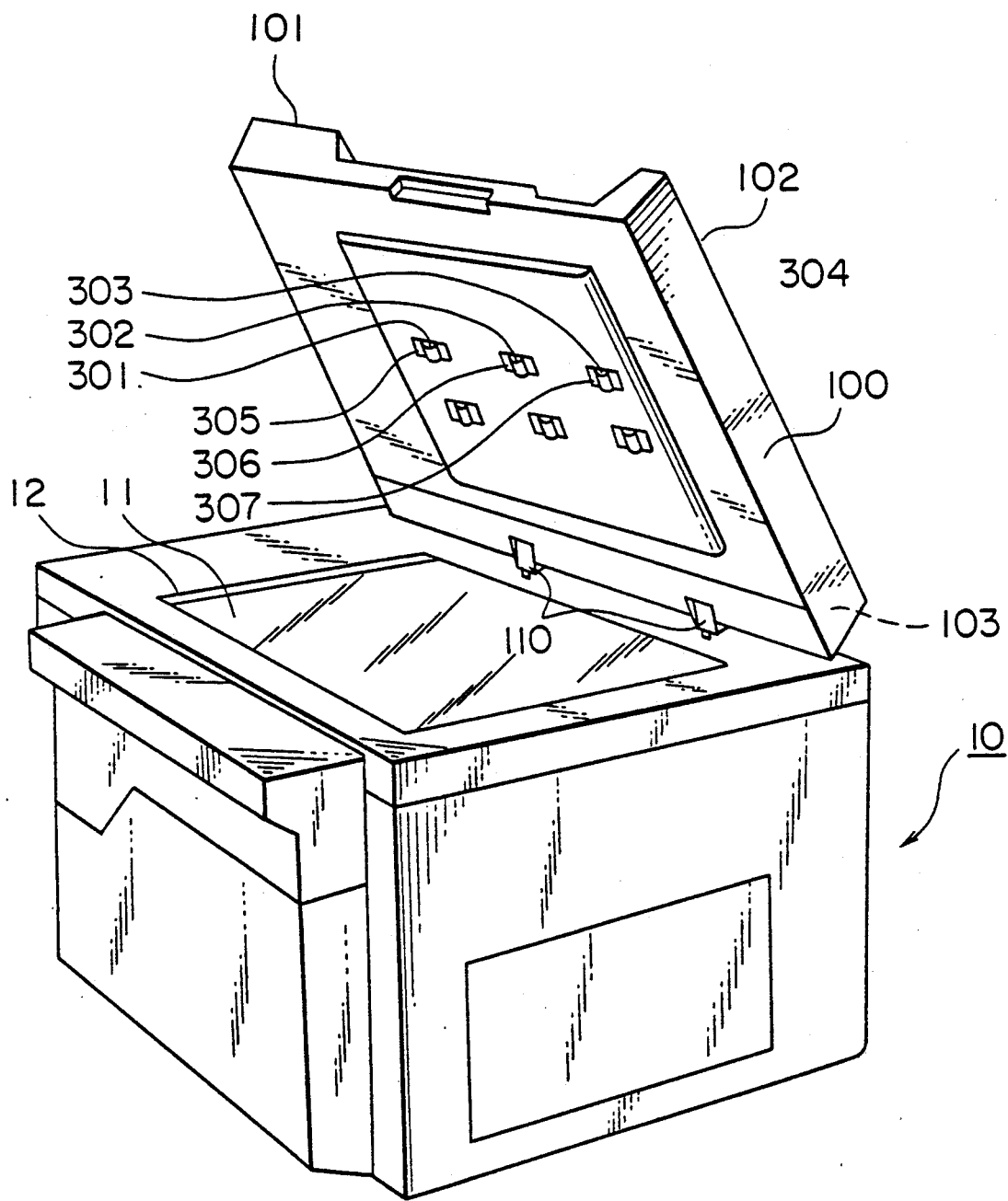
FIG. 6 is a perspective view of the copier in which the document feeder is opened.

The housing 100 has a monocoque structure which combines the frame with the external cover. The housing 100 is strongly formed by molding heat resisting thermal plastic resin such as denatured PPO (polyphenylene oxide). As illustrated in FIG. 5, the three walls of the housing 100 are formed into a shape the section of which is square. The members for the document feed part 200 are installed inside the first box-shaped wall 101. The members of the document delivery part 400 are installed inside the second box-shaped wall 102. A drive means and a drive force transmission means including the main motor 215 which conveys and delivers document D are installed inside the third box-shaped wall 203 which connects the first box-shaped wall with the second box-shaped wall. As a whole, the box-shaped walls form a U-shape. A hinge means which makes opening and closing of the housing possible with regard to the copier, is installed at the rear.

The height of the box-shaped walls 101, 102, 103 is determined by the members built in each box-shaped wall. The flat low portion close to the center surrounded by the walls 101, 102, 103 is the delivery tray 104 on which the delivered documents are stacked. The delivery tray 104 is integrally formed with the walls 101, 102, 103. A plurality of protrusions 104a are provided on the surface of the delivery tray 104 in order to enable document D to slide onto the tray smoothly. Since the portion 104b is a little lower than the delivery tray 104, a pile of documents D which were delivered onto the delivery tray 104 and stacked on the tray, can be easily grasped by hand to remove them from the tray. In this way, a pile of documents D can be easily and securely removed from the limited space due to the concave portion 104b. The document conveying rollers 301, 302, 303, the drive force transmission means, and the sheet member 304 are installed in the space under the delivery tray 104. As a whole, the apparatus is made so as to be low in its total height.

The cutaway section 105 on the front side of the housing 100 is for opening and closing the document feeder by hand.

On the rear of the housing 100, in other words on the third box-shaped wall 103, a pair of hinge means 110 are mounted tightly being to be able to swing. The base of the hinge means is fixed to the copier 10.

Since the heavy drive unit is mounted on the wall 103 at the rear of the housing 100, the center of gravity is located toward the back side of the housing. Since the hinge means 110 holding the whole weight of the document feeder is placed toward the back of the housing close to the center of gravity, it is easy to open and close the document feeder.

The three walls composing the housing 100 have a strong frame structure. The frame has a U-shape. As a result, the housing 100 is not deformed when the document feeder is opened and closed and even when a three dimensional object is placed on the platen glass and copied.

As explained above, the present invention relates to the document feeder in which the following advantageous points are realized: the height of the apparatus is reduced, the size is compact; the weight is light; and its maintenance is easy. Particularly, the housing is composed of a strong and light frame with the monocoque structure. The housing in which the document feed part, the document delivery part, and the drive part are installed, is composed of three walls the section of which is square and the three walls form a U shape. The document conveyance part is installed under the low flat portion close to the center of the housing. The document tray and the delivery tray are installed on the flat portion of the housing.

Since the drive part is placed close to the hinge means, the center of gravity is adjacent to the hinge means, and as the document feeder is also light, it is easy to open and close.

What is claimed is:

1. An apparatus for feeding documents across a platen and receiving documents discharged from the platen, said apparatus comprising:

a housing unit pivotally attached at a first side edge to cover the platen and having an opposite second side edge, said housing unit including a planar surface portion, and having first, second, and third sub-housing portions with outer and inner walls of a predetermined height, said inner walls defining a portion of the perimeter of the planar surface portion of the housing unit for supporting discharged documents, said planar surface portion extending to and including the opposite second side edge so as to permit removal of discharged documents in a direction parallel to said planar surface portion;

means disposed in said first sub-housing portion for feeding documents to the platen;

means disposed in said second sub-housing portion for discharging documents from the platen; and means disposed in said third sub-housing portion for driving said feeding means and said discharging means.

2. The apparatus of claim 1, wherein said planar surface portion has a concave portion to facilitate the removal of documents therefrom.

3. The apparatus of claim 2, wherein said concave portion is located on the second side edge.

4. The apparatus of claim 1, wherein said outer walls define a portion of the perimeter of said housing unit.

5. The apparatus of claim 1, wherein said housing unit is a monocoque structure.

6. The apparatus of claim 5, wherein said housing is made of heat resisting thermal plastic resin.

7. The apparatus of claim 1, wherein the planar surface portion includes a plurality of elongated protrusions extending parallel to one another.

8. The apparatus of claim 1, further comprising a plurality of rollers provided under the planar surface portion in the housing unit for conveying documents on the platen.

9. The apparatus of claim 1, wherein a concave portion is provided between said planar surface portion and said inner wall of said second sub-housing portion.

* * * * *